US006222633B1

United States Patent
Audren et al.

(10) Patent No.: US 6,222,633 B1
(45) Date of Patent: Apr. 24, 2001

(54) GYROS HAVING AN OPTICAL FIBER LOOP AND A DUAL PHASE-CONJUGATE MIRROR

(75) Inventors: Jean Thierry Audren, St Rémy les Chevreuse; Gerald Roosen, La Celles les Bordes; Philippe Delaye, Paris, all of (FR)

(73) Assignee: SFIM Industries (FR)

( * ) Notice: Subject to any disclaimer, the term of this patent is extended or adjusted under 35 U.S.C. 154(b) by 0 days.

(21) Appl. No.: 09/477,647

(22) Filed: Jan. 5, 2000

(30) Foreign Application Priority Data

Jan. 5, 1999 (FR) .................................................. 99 00023

(51) Int. Cl.$^7$ ................................................. G01C 19/72
(52) U.S. Cl. ........................................... 356/460; 356/465
(58) Field of Search ..................................... 356/460, 464, 356/465; 250/227.19, 227.27; 385/12, 14

(56) References Cited

U.S. PATENT DOCUMENTS

| 4,575,245 | * | 3/1986 | Borde | 356/450 |
| 4,681,446 | * | 7/1987 | Yeh | 356/460 |
| 4,944,591 | * | 7/1990 | McMichael | 356/460 |
| 5,898,497 | * | 4/1999 | Audren | 356/460 |

FOREIGN PATENT DOCUMENTS

PS 67 025   5/1969 (DE) .

* cited by examiner

*Primary Examiner*—Samuel A. Turner
(74) *Attorney, Agent, or Firm*—Blakely Sokoloff Taylor & Zafman

(57) ABSTRACT

A gyroscope comprising a source for emitting a light beam, an optical fiber loop in which the light propagates in both directions, a dual phase-conjugate mirror disposed in said loop in such a manner that light reaches said mirror from both sides thereof, recombination means for recombining the light which has propagated round the loop, and detector means for detecting the recombined signal, wherein the loop includes a monomode fiber that does not conserve polarization and wherein depolarization means are disposed between said fiber and the phase-conjugate mirror, on either side thereof.

10 Claims, 1 Drawing Sheet

GYROS HAVING AN OPTICAL FIBER LOOP AND A DUAL PHASE-CONJUGATE MIRROR

The present invention relates to optical fiber gyroscopes.

BACKGROUND OF THE INVENTION

In patent application FR 2 754 893 the Applicant has already proposed a Sagnac effect gyroscope structure having a multimode optical fiber loop in which a dual phase-conjugate mirror is disposed. Light reaching said mirror from one side thereof constitutes a pumping wave for light reaching said mirror from the other side thereof, and vice versa.

Such an optical gyroscope structure makes it possible to achieve the same sensitivity both for fast phase shifts and for phase shifts that are slower.

In addition, it presents advantages in terms of cost, given that multimode fibers are less expensive than polarization-conserving monomode fibers of the kind generally used in Sagnac effect gyroscopes.

Nevertheless, multimode fibers are of large diameter which gives rise to gyroscope coils of large size, particularly when the length of fiber used is itself considerable.

Furthermore, mode decomposition, or speckle patterning, at the outlet from a multimode fiber turns out to be highly sensitive to variation in certain external parameters, such as temperature or vibration, which can give rise to local variations of index. This makes it necessary to isolate the coil from external stresses.

OBJECT AND SUMMARY OF THE INVENTION

An object of the invention is to propose a Sagnac effect optical fiber gyroscope structure which does not have those drawbacks.

To this end, the invention provides a gyroscope comprising a source for emitting a light beam, an optical fiber loop in which the light propagates in both directions, a dual phase-conjugate mirror disposed in said loop in such a manner that light reaches said mirror from both sides thereof, recombination means for recombining the light which has propagated round the loop, and detector means for detecting the recombined signal, wherein the loop includes a monomode fiber that does not conserve polarization and wherein depolarization means are disposed between said fiber and the phase-conjugate mirror, on either side thereof.

BRIEF DESCRIPTION OF THE DRAWING

Other characteristics and advantages of the invention will appear on reading the following description of an embodiment of the invention. The description is purely illustrative and non-limiting. It should be read with reference to the accompanying figures, in which.

MORE DETAILED DESCRIPTION

Figure 1:
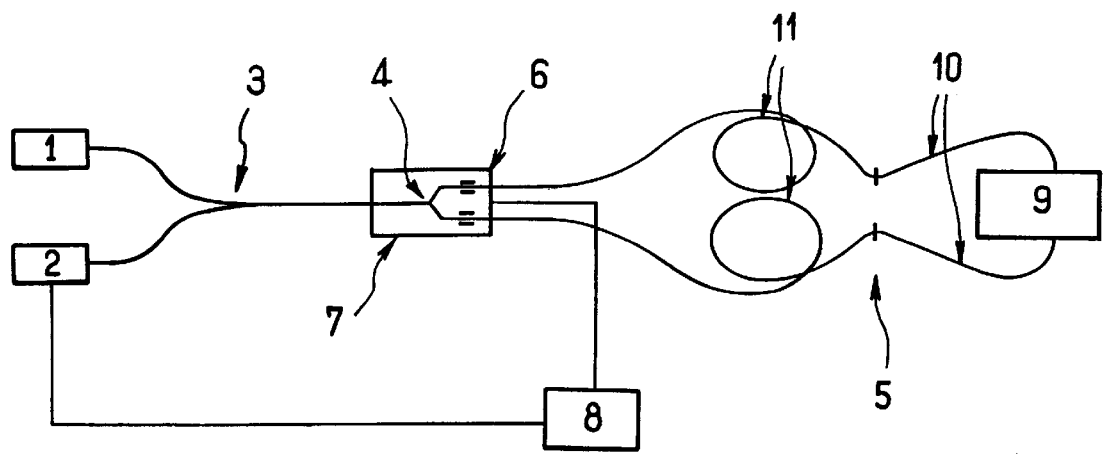
FIG. 1 is a diagrammatic representation of an optical fiber gyroscope constituting one possible embodiment of the invention.

The FIG. 1 Sagnac effect gyro has a laser emitter module 1 and a detector module 2 connected via a coupler 3 and a Y junction 4 to an optical fiber loop 5.

The junction 4 is integrated together with modulator means 6 disposed at the inlet to the loop 5 on one or other of the two arms thereof, in an optical circuit 7.

The modulator means 6 are controlled by a processor unit 8 to which there are applied electrical or digital signals output by the module 2.

The middle portion of the loop 5 has a segment 10 of multimode fiber having a device 9 integrated therein to constitute a dual phase-conjugate mirror.

The remainder of said loop 5 is made of monomode optical fiber 11 that does not conserve polarization.

The phase conjugation on either side of the dual phase-conjugate mirror constituted by the device 9 is pumped by the wave reaching said device from the opposite side thereof from which the conjugate wave departs.

As explained in French patent application FR 2 754 893, to which reference can advantageously be made, the sensitivity of the gyro is the same for phase shifts that are fast and for phase shifts that are slow.

The dual phase-conjugate mirror 9 is constituted, for example, by a crystal of BSO.

The monomode fiber segments 11 can transmit only a single polarization which, although it varies little in the presence of fast disturbances such as vibration, varies considerably over time, for example with temperature. That is why the multimode optical fiber segment 10 is selected to be long enough to make mode decomposition (or speckle patterning) possible, thereby making it possible for the dual phase-conjugate mirror 9 to function.

A length of about 1 meter (m) or longer is preferred.

The two fiber portions making up the multimode segment 10 are preferably fixed rigidly to the support of the dual phase-conjugate mirror so that the assembly constitutes a single block for vibration.

To ensure that the block does not deform under the effect of vibration, it can be made to be small and compact.

Figure 2:
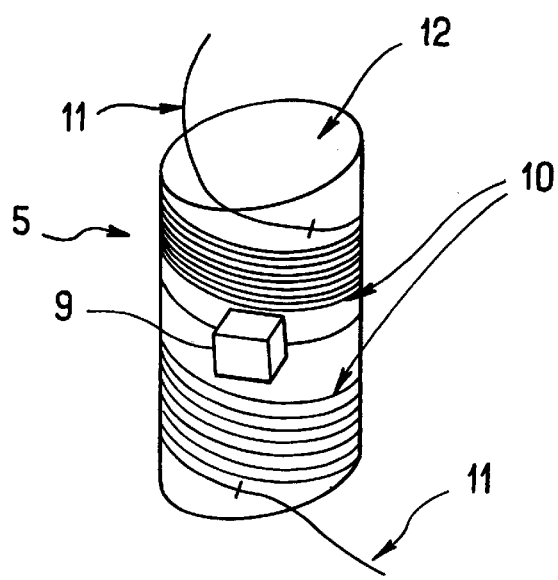
FIG. 2 is a diagrammatic perspective view of the middle portion of the optical fiber loop of the gyroscope wound onto its core.

As shown in FIG. 2, the support is advantageously constituted by a core 12 to which the dual phase-conjugate mirror 9 is secured. The multimode fiber segments 11 can be attached to said core 12 by adhesive, for example. The entire loop 5 is coiled on the core 12. In a variant, provision can be made for the core 12 to be associated with a second core.

The or each core can be made of various different materials. Advantageously, a material is selected whose coefficient of expansion corresponds substantially to that of the fiber, for example glass or the metal sold under the trademark "Dilver".

Other variant embodiments are naturally possible. In particular, depolarization upstream from the dual phase-conjugate mirror can be implemented by depolarization means other than segments of multimode fiber, providing said depolarization means are disposed on both sides of the said phase-conjugate mirror and are reciprocal.

Such depolarization means can advantageously be constituted by frosted inlet faces of the dual phase-conjugate mirror.

What is claimed is:

1. A gyroscope comprising a source for emitting a light beam, an optical fiber loop in which the light propagates in both directions, a dual phase-conjugate mirror disposed in said loop in such a manner that light reaches said mirror from both sides thereof, recombination means for recombining the light which has propagated round the loop, and detector means for detecting the recombined signal, wherein the loop includes a monomode fiber that does not conserve polarization and wherein depolarization means are disposed between said fiber and the phase-conjugate mirror, on either side thereof.

2. A gyroscope according to claim 1, wherein the depolarization means are constituted by segments of multimode fiber.

3. A gyroscope according to claim 2, wherein the length of the segments of multimode fiber in the loop is of the order of 1 m or greater.

4. A gyroscope according to claim 2, wherein the multimode fiber segments are rigidly fixed to a support on which the dual phase-conjugate mirror is also fixed.

5. A gyroscope according to claim 4, wherein the multimode fiber segments are rigidly fixed on a core which serves as a support for the dual phase-conjugate mirror.

6. A gyroscope according to claim 5, wherein the multimode fiber segments are stuck to the core by adhesive.

7. A gyroscope according to claim 5, wherein the core is made of a material whose coefficient of expansion is equal or close to that of the fiber.

8. A gyroscope according to claim 7, wherein the material of the core is glass or a metal of the "Dilver" type.

9. A gyroscope according to claim 5, wherein the fiber of the loop is coiled on two cores.

10. A gyroscope according to claim 1, wherein the inlet faces of the dual phase-conjugate mirror are frosted.

* * * * *